J. A. CLARKE.
SEED PLANTER AND FERTILIZER DISTRIBUTER.
APPLICATION FILED MAY 18, 1912.
1,058,552.
Patented Apr. 8, 1913.
2 SHEETS—SHEET 2.
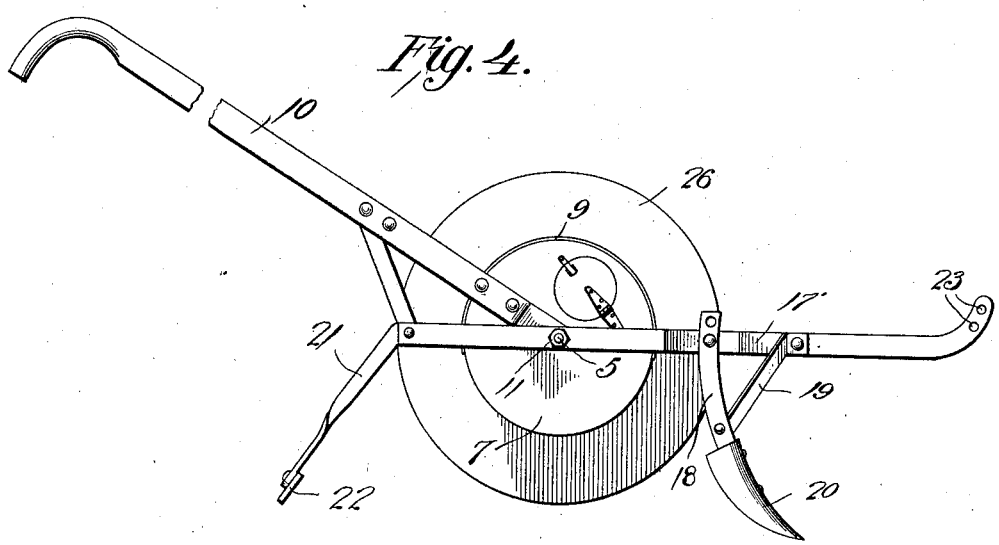
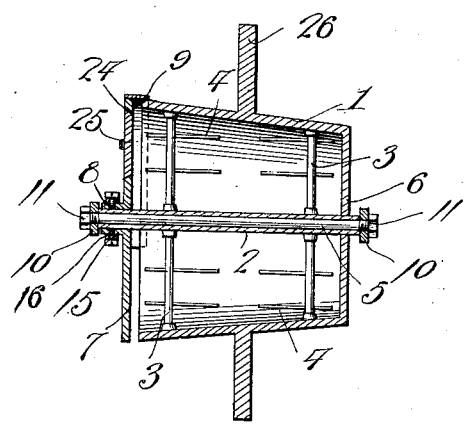
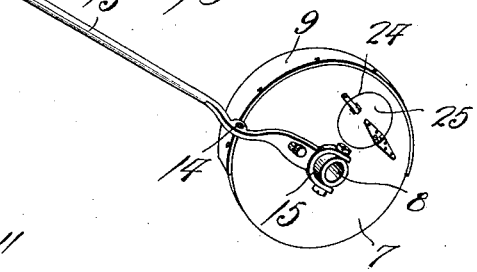
Witnesses
Inventor
James A. Clarke,
By Victor J. Evans
Attorney

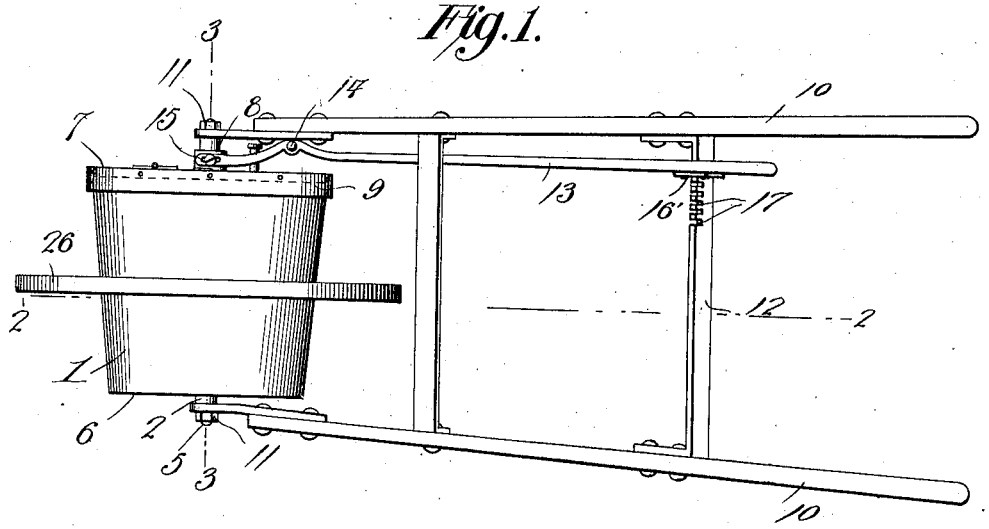
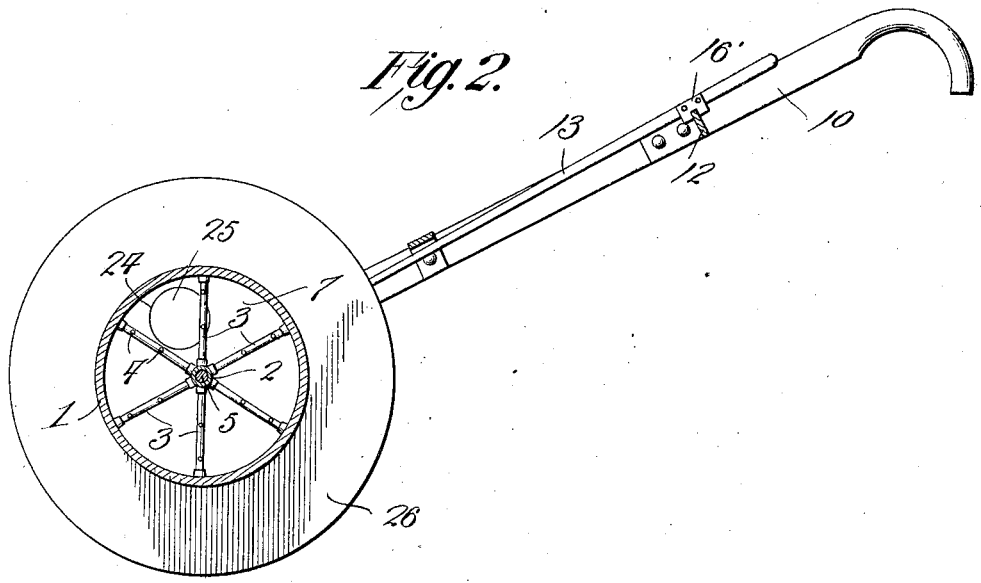

UNITED STATES PATENT OFFICE.

JAMES ALLEN CLARKE, OF PINE HILL, ALABAMA.

SEED-PLANTER AND FERTILIZER-DISTRIBUTER.

1,058,552. Specification of Letters Patent. Patented Apr. 8, 1913.

Application filed May 18, 1912. Serial No. 698,289.

*To all whom it may concern:*

Be it known that I, JAMES ALLEN CLARKE, a citizen of the United States, residing at Pine Hill, in the county of Wilcox and State of Alabama, have invented new and useful Improvements in Seed-Planters and Fertilizer-Distributers, of which the following is a specification.

This invention relates to seed planters and fertilizer distributers, and it has particular reference to machines of this class in which the seed or fertilizing material is carried in a revolving drum from which the material to be deposited is conveyed direct to the ground.

One object of the invention is to provide a device of this class having simple and improved means for regulating the amount of material to be deposited.

A further object of the invention is to construct a device of this class which may be conveniently used either with or without a plow constituting a furrow opener and suitable gathering or covering means.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a device constructed in accordance with the invention and without the furrow opener and the gathering means. Fig. 2 is a longitudinal sectional view of the same taken on the line 2—2 in Fig. 1. Fig. 3 is a transverse vertical sectional view taken on the line 3—3 in Fig. 1. Fig. 4 is a side elevation of the device showing the same equipped with a furrow opener and a covering device. Fig. 5 is a perspective detail view of the regulating disk and the means for actuating the same, detached.

Corresponding parts in the several figures are denoted by like characters of reference.

The drum or receptacle 1 of the improved device, which is supported for rotation about an approximately horizontal axis, is of the shape of a conical frustum, so that as the said drum is revolved the contents will gravitate in the direction of the base of the frustum, or, in other words, toward one end of the drum. Supported axially within the drum 1 is a tube 2, said tube being supported by means of radial or diametrical arms 3, 3 which are preferably provided with laterally extending fingers 4 constituting stirring or agitating devices. The axle 5 extends through the diametrical tube 2, which latter also extends through the head or closure 6 at the small end of the drum.

The large end of the drum 1, which is open, is obstructed by a head or closure 7 having an axial hub or collar 8 which movably engages one end of the tube 2 so that the head 7 may be slid or moved toward or from the open end of the drum so as to vary the space between the latter and the closure, or to entirely obstruct the open end of the drum when desired. The head 7, which is prevented from rotating by means to be presently described and which is simply slidable on the tube 2, is provided with a shield 9 extending about approximately the upper half of the circumference thereof and overlapping the end of the drum so as to obstruct the crevice or opening between the end of the drum and the movable head, thereby preventing waste of material. It is obvious that the shield, when desired, may be extended about a greater portion of the circumference of the drum than illustrated in the drawing, thereby limiting the extent of the crevice through which material will be permitted to escape.

Handles 10, 10 are mounted on the axle 5 adjacent to the ends of the tube 2, said handles being secured by means of nuts 11 threaded upon the ends of the axle. Said handles are connected together by means of braces, one of which, 12, supports one end of a lever 13 which is fulcrumed at 14 upon one of the handles, said lever being bent so that the arms thereof may be moved toward and from the handle upon which it is fulcrumed. One end of the lever is bifurcated, as shown at 15, and engages an annular groove 16 in the hub or collar 8 of the movable head 7, which latter is also secured upon the lever so as to be movable by means of said lever toward or from the open end of the drum. That end of the lever 13 which is supported on the cross bar 12 is provided with a stop member 16' adapted to engage notches 17 in said cross bar for the purpose of retaining the parts in adjusted position to gage the dimensions of the escape opening between the movable head 7 and the open end of the drum.

A beam 17' is adapted to be mounted on the axle 5 adjacent to one end of the tube 2, said beam being equipped with a standard 18 reinforced by a brace 19 and carrying a suitable plow or furrow opener 20. The beam 17' is also equipped with arms 21 supporting a covering device 22 of suitable construction. The front end of the beam is provided with apertures 23 for the attachment of a draft element. The movable head 7 of the drum is provided with a filling aperture 24 which is normally obstructed by a hingedly supported door or closure 25. The drum is provided with a circumferential ground engaging flange 26, whereby it is supported at a suitable distance above the ground, said flange serving as a transporting wheel when the device is to be operated or to be moved from place to place.

The operation and advantages of this invention will be readily understood from the foregoing description taken in connection with the drawings hereto annexed.

The seed or fertilizing material which is to be deposited may be introduced into the drum through the filling opening 24 which is then obstructed by the top or closure 25. While traveling through the field, or when it is not desired to discharge any of the contents, the movable head 7 may be moved in the direction of the drum so as to completely obstruct the open end of the latter. By moving the head 7 in the opposite direction a crevice or opening of any desired width may be produced between said head and the open end of the drum. By grasping the handles of the machine, the drum may be trundled over the field in the fashion of an ordinary wheelbarrow, the flange 26 serving to support the drum at the proper distance above the ground. As the drum rotates the contents thereof will be agitated and broken up by the radial arms 3 and the fingers 4, and the contents will gravitate in the direction of the discharge crevice between the head 7 and the open end of the drum through which it will escape to the ground, as will be readily understood.

When the machine is used in connection with the furrow opener and the covering device, a draft animal is preferably used, the same being hitched to the front end of the beam and the machine being guided by the handles.

The construction of the improved device is simple and inexpensive, and it has been found to be thoroughly efficient for the purposes for which it is provided.

Having thus described the invention, what is claimed as new, is:—

1. In a device of the character described, a frusto-conical drum open at its large end, a tube supported axially within the drum and extending through the ends thereof, a circumferential ground-engaging flange on the drum, an axle extending through the tube, handles associated with the axle, and a non-rotatable head slidably supported on the tube for movement toward and from the open end of the drum.

2. In a device of the character described, a frusto-conical drum closed at its small end and open at its large end, a tube extending axially through said drum, arms supporting the axial tube within the drum and having laterally extending agitating fingers, an axle extending through the tube, handles connected with the ends of the axle, a cross brace connecting the handles, a non-rotatable head slidable on the tube toward and from the open end of the drum, and a lever fulcrumed on one of the handles and having one arm connected with the movable head and another arm supported on the cross bar that connects the handles.

3. In a seed planter and fertilizer distributer, a frusto-conical drum supported for rotation and having a closed small end and an open large end, an axial tube extending through and supported within the drum, a head slidable on the axial tube toward and from the open end of the drum, a suitably supported lever having one arm connected with the head to support said head against rotation and to move said head toward and from the open end of the drum, and a shield connected with the non-rotatable head and extending part-way about the circumference of the drum.

4. In a device of the character described, a frusto-conical drum open at its large end, a tube extending axially through the drum, an axle extending through the tube, handles connected with the axle, a non-rotatable head supported slidably for movement toward and from the open end of the drum, a beam mounted on the axle, and furrow opening and covering devices carried by the beam.

In testimony whereof I affix my signature in presence of two witnesses.

JAMES ALLEN CLARKE.

Witnesses:
J. P. McCALL,
W. L. McCALL.